United States Patent
Jiang et al.

(10) Patent No.: US 10,759,922 B2
(45) Date of Patent: Sep. 1, 2020

(54) FLAME RETARDANT ADDITIVE FOR A LOW SMOKE, ZERO HALOGEN COMPOUND

(71) Applicant: Corning Optical Communications LLC, Hickory, NC (US)

(72) Inventors: Dayue Jiang, Painted Post, NY (US); Kevin Andrew Vasilakos, Painted Post, NY (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/193,634

(22) Filed: Nov. 16, 2018

(65) Prior Publication Data

US 2019/0085154 A1    Mar. 21, 2019

Related U.S. Application Data

(63) Continuation of application No. PCT/US2017/033022, filed on May 17, 2017.

(60) Provisional application No. 62/341,366, filed on May 25, 2016.

(51) Int. Cl.
| | | |
|---|---|---|
| C08K 5/5399 | (2006.01) | |
| C08K 3/34 | (2006.01) | |
| C08K 9/12 | (2006.01) | |
| C08K 3/32 | (2006.01) | |
| C08K 5/053 | (2006.01) | |
| C08K 5/3492 | (2006.01) | |
| C08K 13/02 | (2006.01) | |
| G02B 6/44 | (2006.01) | |
| C08K 5/00 | (2006.01) | |
| C08F 110/06 | (2006.01) | |
| C08K 5/3445 | (2006.01) | |
| H01B 7/295 | (2006.01) | |

(52) U.S. Cl.
CPC .......... *C08K 5/5399* (2013.01); *C08F 110/06* (2013.01); *C08K 3/32* (2013.01); *C08K 3/34* (2013.01); *C08K 5/0066* (2013.01); *C08K 5/053* (2013.01); *C08K 5/34922* (2013.01); *C08K 9/12* (2013.01); *C08K 13/02* (2013.01); *G02B 6/4436* (2013.01); *C08K 5/0091* (2013.01); *C08K 5/3445* (2013.01); *C08K 2003/323* (2013.01); *H01B 7/295* (2013.01)

(58) Field of Classification Search
CPC .......... C08K 5/5399; C08K 3/34; C08K 9/12; C08K 3/32; C08K 5/053; C08K 5/3492; C08K 13/02; G02B 6/44
See application file for complete search history.

(56) References Cited

FOREIGN PATENT DOCUMENTS

| CN | 1827669 A | | 9/2006 |
|---|---|---|---|
| CN | 10-3435844 A | * | 12/2013 |
| CN | 103421241 A | | 12/2013 |
| CN | 103435844 A | | 12/2013 |
| CN | 104059224 A | | 9/2014 |
| CN | 104610571 A | | 5/2015 |

OTHER PUBLICATIONS

Abdullaeva et al; "Preparation of a Blue Heteropoly Acid for Modification of Nitron Polyacrylonitrile Fiber" Uzbekskii Khimicheskii Zhurnal (1990), (5), 61-4. Language: Russian.
Chen et al; "Increasing the Efficiency of Intumescent Flame Retardant Polypropylene Catalyzed by Polyoxometalate Based Ionic Liquid"; J. Mater. Chem. A; 1; (2013) pp. 15242-15246.
Chen et al; "Roles of Anion of Polyoxometalate-Based Ionic Liquids in Properties of Intumescent Flame Retardant Polypropylene"; RSC Adv., 4; (2014) pp. 32902-32913.
Gao et al; "Smoke Suppression of Surface-Coated Polyoxometalate in IFR Cable Materials" Suliao Keji (2013), 41(4), 102-106. Language: Chinese.
International Search Report and Written Opinion of the International Searching Authority; PCT/US2017/033022; dated Aug. 11, 2017; 22 Pages; European Patent Office.
Li et al; "Effect of a Novel Charring-Foaming Agent on Flame Retardancy and Thermal Degradation of Intumescent Flame Retardant Polypropylene"; Polymer Degradation and Stability; 91; (2006) pp. 1380-1386.
Liu et al; "Catalytic Action of Phospho-Tungstic Acid in the Synthesis of Melamine Salts of Pentaerythritol Phosphate and Their Synergistic Effects in Flame Retarded Polypropylene"; Polymer Degradation and Stability; 91 (2006) pp. 2513-2519.
Musko et al; "Heterogeneously Catalysed Aldol Reactions in Supercritical Carbon Dioxide as Innovative and Non-Flammable Reaction Medium"; Top Catal (2011) 54; pp. 1115-1123.
Zhang et al; "Study of Intumescent Flame Retardant Copolyester Hot Melt Adhesive", Fire and Polymers VI: New Advances in Flame Retardant Chemistry and Science, Chapter 13, pp. 183-191, ACS Symp. Series, vol. 1118.

* cited by examiner

*Primary Examiner* — Robert D Harlan
(74) *Attorney, Agent, or Firm* — William D. Doyle

(57) ABSTRACT

A low smoke, zero halogen (LSZH) polymer composition is provided. The LSZH polymer composition includes a polymer resin, and a flame retardant package dispersed within the polymer resin. Less than 25% by weight of the polymer composition is the flame retardant package. The flame retardant package includes an acid source, a carbon source, and an LSZH additive. The LSZH additive includes a polyoxometalate ionic liquid and a synergist carrier. The LSZH polymer composition has a limiting oxygen index of greater than 31%. The LSZH polymer compound is suitable for use in electrical or tele-communication cables.

15 Claims, 3 Drawing Sheets

FLAME RETARDANT ADDITIVE FOR A LOW SMOKE, ZERO HALOGEN COMPOUND

CROSS-REFERENCE TO RELATED APPLICATIONS

This application is a continuation of International Application No. PCT/US17/33022 filed on May 17, 2017 which claims the benefit of priority to U.S. Provisional Application No. 62/341,366, filed on May 25, 2016, both applications being incorporated herein by reference.

BACKGROUND

The disclosure relates generally to flame retardant compounds and more particularly to a low smoke, zero halogen compound. Flame retardant materials are used to protect combustible materials, such as plastics or wood, from fire damage and heat. Additionally, flame retardant materials have been used to protect materials that lose their strength when exposed to high temperatures, such as steel.

SUMMARY

In one aspect, a low smoke, zero halogen (LSZH) polymer composition is provided. The LSZH polymer composition includes a polymer resin, and a flame retardant package dispersed within the polymer resin. Less than 25% by weight of the polymer composition is the flame retardant package. The flame retardant package includes an acid source, a carbon source, and an LSZH additive. The LSZH additive includes a polyoxometalate ionic liquid and a synergist carrier. The LSZH polymer composition has a limiting oxygen index of greater than 31%.

In another aspect, an electrical or tele-communication cable is provided. The cable includes at least one communication element and a polymeric jacket that surrounds the at least one communication element. The polymeric jacket includes a flame retardant package dispersed throughout the polymer jacket. The flame retardant package includes an acid source, a carbon source, and an additive. The additive includes a polyoxometalate ionic liquid and a synergist carrier. The polymeric jacket has a limiting oxygen index of greater than 30%.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of an additive, such as a low smoke, zero halogen (LSZH) compound suitable for use as, for example, a flame retardant in polymer compounds are provided. The LSZH additive includes a polyoxometalate ionic liquid combined with a synergist carrier. The LSZH additive is deployed as part of a flame retardant package. In embodiments, the flame retardant package is an intumescent flame retardant package. The LSZH additive can be included, for instance, in a polymer resin. The resulting LSZH polymer resin can be utilized in such applications as cable jackets for fiber optic cables. However, while fiber optic cables will be discussed as an exemplary embodiment, the LSZH additive can be utilized in a variety of other contexts and applications.

The LSZH additive is designed to enhance the efficacy of flame retardant compounds, including intumescent flame retardant compounds, and to limit the amount of smoke emitted from a polymer (or other matrix) containing the LSZH additive in the event of a fire. Additionally, the polymer compounds containing the LSZH additive emit very low or no halogens when exposed to high heat sources. Accordingly, a polymer resin containing an LSZH additive will emit little or no toxic and/or corrosive smoke.

Figure 1:
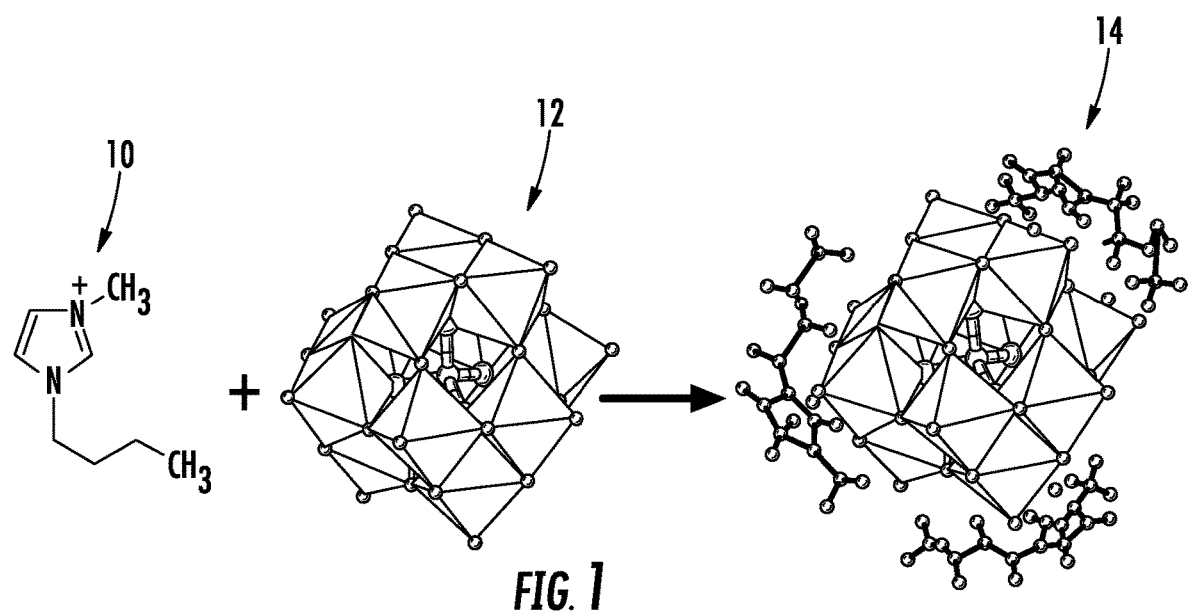
FIG. 1 depicts a schematic representation of a reaction between an ionic liquid cation and a polyoxometalate anion to form a polyoxometale ionic liquid used in a low smoke, zero halogen compound according to an exemplary embodiment.

In an embodiment, the LSZH additive is comprised of a polyoxometalate ionic liquid and a synergist carrier. As shown in FIG. 1, an ionic liquid cation 10 and polyoxometalate anion 12 are reacted to form a polyoxometalate ionic liquid (PIL) 14. FIG. 1 depicts a reaction between a 1-butyl-3-methylimidazolium (1+) cation (from the ionic liquid) and a phosphomolybdate ([PMo$_{12}$O$_{40}$]$^{3-}$) anion (the polyoxometalate) to form 1-butyl-3-methylimidazolium phosphomolybdate (the PIL).

A variety of ionic liquids are suitable for use in the LSZH additive, including 1-ethyl-3-methyl-imidazolium ethylsulfate, 1-butyl-3-methylimidazolium hexafluorophosphate, 1-butyl-3-methylimidazolium tetrafluoroborate, 1-hexyl-3-methylimidazolium hexafluorophosphate, 1-butyl-3-methyl-imidazolium bis(trifluoromethanesulfonyl)imide, 1-ethyl-3-methylimidazolium trifluoromethanesulfonate, scandium (III) trifluoromethanesulfonate, praseodymium (III) trifluoromethanesulfonate, 1,3-dialkyl-1,2,3-triazolium hexafluorophosphate, 1,3-dialkyl-1,2,3-triazolium bis(trifluoromethanesulfonyl)imide, and 1,2,4-trimethylpyrazolium methylsulfate, among others. Generally, salts containing imidazolium cation, quaternary cationic scales, cationic pyrrole, and/or pyrazole cation are suitable ionic liquids for use in the LSZH additive.

Polyoxometalate anions suitable for use in the LSZH additive include [PW$_{12}$O$_{40}$]$^{3-}$, [PMo$_{12}$O$_{40}$]$^{3-}$, [SiW$_{12}$O$_{40}$]$^{4-}$, [SiMo$_{12}$O$_{40}$]$^{4-}$, [BW$_{12}$O$_{40}$]$^{3-}$, [BMo$_{12}$O$_{40}$]$^{3-}$, $[AsW_{12}O_{40}]^{5-}$, $[AsMo_{12}O_{40}]^{5-}$, $[GeW_{12}O_{40}]^{4-}$, $[GeMo_{12}O_{40}]^{4-}$, $[PMo_9V_3O_{40}]^{5-}$, $[PMo_{10}V_2O_{40}]^{5-}$, $[PMo_{11}VO_{40}]^{4-}$, $[P_2W_{18}O_{62}]^{6-}$, $[P_2Mo_{18}O_{62}]^{6-}$, $[As_2W_{18}O_{62}]^{6-}$, $[As_2Mo_{18}O_{62}]^{6-}$, $[W_6O_{19}]^{2-}$, $[Mo_6O_{19}]^{2-}$, $[V_6O_{19}]^{8-}$, $[Nb_6O_{19}]^{8-}$, among others. In specific embodiments, the polyoxometalate is selected to contain molybdenum because of molybdenum's function as a smoke suppressant.

Figure 2:
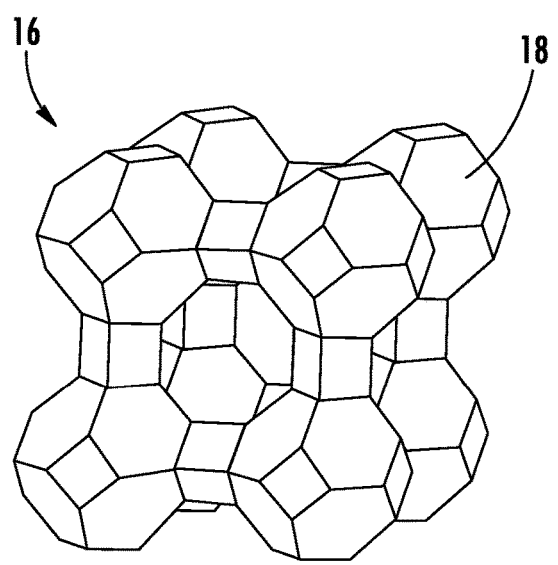
FIG. 2 depicts a zeolite synergist carrier used in a low smoke, zero halogen compound according to an exemplary embodiment.

After reaction of the ionic liquid and polyoxometalate to form the PIL, the PIL is loaded into, or otherwise mixed with, a synergist carrier 16, the crystal structure of which is depicted in FIG. 2. In embodiments, the synergist carrier is an inorganic compound, such as a zeolite, a bentonite, and/or zinc borate, among others. The use of the term "synergist" denotes that the synergist carrier operates with the polyoxometalate ionic liquid to enhance flame and/or smoke suppression. The synergist carrier can do so in a variety of ways, including forming a ceramic layer in or on the char layer/foam, releasing water when decomposed to dilute the combustible gases and/or to suppress smoke, thermally insulating the polymer compound, functioning as an anti-dripping agent, and/or, together with the polyoxometalate ionic liquid, promoting the function (e.g., the catalytic effect) on the charring process of the flame retardant package. In a particular embodiment, the synergist is zeolite 4A 18. FIG. 2 depicts the structure of zeolite 4A 18. Zeolite 4A 18 has a pore diameter of 4 Å and a bulk density of 0.60-0.65 g/mL. Additionally, zeolite 4A can absorb 20-21%, by weight, of water and exhibits an attrition of 0.3-0.6%, by weight. In embodiments, the zeolite and polyoxometalate ionic liquid comprise between 0.1 to 5% of the total weight of the composition into which the LSZH additive is deployed.

The LSZH additive is deployed as part of a flame retardant package. The flame retardant package also includes an acid source and a carbon source. In embodiments, the acid source can be a phosphorous-, boron-, or sulfur-containing chemical. In an embodiment, the acid is a phosphorous-containing chemical, such as ammonium polyphosphate (APP). In embodiments, the carbon source is a polyol, such as pentaerythritol (PER) and/or its derivatives. In other embodiments, the carbon source can include phenol formaldehyde resins, polyamides, sorbitol, starches, and cyclodextrins, among others. The acid source, under heating, decomposes and forms an acid that catalyzes the carbon source to carbonize and solidify through cross-linking reactions, forming a non-combustible char layer. In embodiments, the ratio of the acid source to the carbon source can vary, such as 1:1, 2:1, etc. In an embodiment in which the acid source is APP and the carbon source is PER, an example ratio of APP:PER is 2:1 or higher.

In still further embodiments, the flame retardant package includes a spumific compound, such as melamine and its derivatives. The spumific compound forms gases when heated, and the gases cause the solidified carbon (i.e., the char layer created in the carbonization reaction of the acid and carbon source) to expand, forming a char foam. The char foam has a much greater volume than the char layer, which helps insulate the remaining polymer compound from fire and heat. A flame retardant package containing a spumific compound is referred to as intumescent flame retardant package.

The flame retardant package can also include other additives, such as antioxidants, thermal stabilizers, metal hydrates, metal hydroxides (e.g., aluminum trihydroxide and/or magnesium dihydroxide), gas-forming species or combinations of species (e.g., melamine and its derivatives, etc.), char strength boosters, and/or other performance enhancing materials. In certain embodiments, the acid source, carbon source, and/or spumific compound are combined into a single compound.

In embodiments, the flame retardant package (including the LSZH additive and any other additives) comprises between 5% and 60% of the total weight of the compound into which the flame retardant package is deployed. In other embodiments, the flame retardant package comprises between 10% and 30% of the total weight of the compound into which the flame retardant package is deployed. In a more specific embodiment, the flame retardant package comprises between 15% and 25% of the total weight of the compound into which the flame retardant package is deployed.

As discussed above, the LSZH additive has particular suitability for incorporation into a variety of polymer resins, including both thermoplastic and thermosetting polymers. In embodiments, the polymer resin is a thermoplastic, and in a more specific embodiment, the thermoplastic is a polyolefin-based resin. Polymer resins that may be used with the LSZH additive include a single polymer or a blend of polymers selected from the following non-limiting list: ethylene-vinyl acetate copolymers, ethylene-acrylate copolymers, ethylene homopolymers (including but not limited to low density, medium density, and high density), linear low density polyethylene, very low density polyethylene, polyolefin elastomer copolymer, propylene homopolymer, polyethylene-polypropylene copolymer, butene- and octene branched copolymers, and maleic anhydride-grafted versions of the polymers listed herein.

The polymer resin may also include non-flame retardant additives such as mineral fillers (talc, calcium carbonate, etc.), antioxidants, UV additives, processing modifiers, compatibilizers, or other standard polymer additives.

A variety of different processes can be used to incorporate the flame retardant package, including the LSZH additive and any other additives, into the polymer resin. Generally, the incorporation processes utilize elevated temperature and sufficient shear to distribute the flame retardant package in the polymer resin. Exemplary equipment for incorporating the flame retardant package into the polymer resin includes a co-rotating twin screw extruder, single screw extruder with mixing zones, a Banbury-style rotary mixer, Buss kneader, and/or other high-shear mixers.

Example

In an exemplary embodiment, a PIL for use in the LSZH additive was prepared from 1-butyl-3-methylimidazolium chloride (an ionic liquid) and ammonium phosphomolybadate (a polyoxomolybdate) by ion-exchange reaction in water with the equivalent at 1:1, i.e., stoichiometric amounts. After the 1-butyl-3-methylimidazolium cations are attached to the phosphomolybdate anions, the cations will remain attached to the anion sites while the resulting ammonium chloride is washed away, leaving the PIL 14 as shown in FIG. 1. The achieved PIL was then mixed with zeolite 4A in water in a ratio of 1:1.5 of PIL:zeolite 4A, by weight. The remainder of the flame retardant package included APP as the acid source and PER as the carbon source in a ratio of 2:1 of APP:PER, by weight. The flame retardant package, including the LSZH additive, was compounded with a polypropylene homopolymer using a twin screw extruder (Leistritz 34 mm Twin Screen Extruder). The flame retardant package comprised 20%, by weight, of the polymer compound with the LSZH additive accounting for 1% of that weight and the APP/PER accounting for the remaining 19%

(the additive and the APP/PER were mixed prior to compounding). Table 1 displays the compounding conditions of the twin screw extruder.

TABLE 1

Compounding Conditions

| | |
|---|---|
| Screw Speed (RPM) | 100 |
| Single Feeder (kg/hr) | 2.25 |
| Twin Screw Feeder (g/min) | 9.4 |
| Zone 1 (° C.) | n/a |
| Zone 2 (° C.) | 150 |
| Zone 3 (° C.) | 180 |
| Zone 4 (° C.) | 180 |
| Zone 5 (° C.) | 160 |
| Zone 6 (° C.) | 160 |
| Zone 7 (° C.) | 160 |
| Zone 8 (° C.) | 160 |
| Zone 9 (° C.) | 160 |
| Zone 10 (° C.) | 160 |
| Die Temp (° C.) | 150 |
| Torque (amps) | 9.1 |
| Vacuum (in/hg) | 5 |

The resulting materials were then injection molded (Arburg 370 C) into test samples with a processing condition as shown in Table 2.

TABLE 2

Injection Molding Conditions

| | |
|---|---|
| Gate Temp (° C.) | 170 |
| Mold Temp Moving Half (° F.) | 100 |
| Mold Temp Fixed Half (° F.) | 100 |
| Temp Zone 1 (° C.) | 170 |
| Temp Zone 2 (° C.) | 180 |
| Temp Zone 3 (° C.) | 190 |
| Temp Zone 4 (° C.) | 200 |
| Temp Zone 5 (° C.) | 200 |
| Dosage Volume (ccm) | 20.5 |
| Holding Pressure Bar Base 1 (Bar) | 900 |
| Holding Time (s) | 3 |
| Step 1: Injection Flow (ccm/s) | 60 |
| Actual Bar Pressure (Bar) | 900 |
| Switch Over Point | 1.65 |

Test samples of a polypropylene sample including the LSZH additive (PP-LSZH), a polypropylene sample containing only the APP/PER of the flame retardant package (PP control), and a pure polypropylene sample (PP) were prepared. A visual combustion test was first performed on the polyproylene samples in which the combustion was triggered using a propane torch. Based on the visual observation, the PP-LSZH sample performed significantly better than the PP control sample. Additionally, the PP-LSZH sample showed a low volume expansion of the resulting char residue.

The polypropylene samples were also tested to determine their limiting oxygen index (LOI) and their UL-94 rating on a vertical burning test. The LOI of a polymer indicates the minimum concentration of oxygen that will support combustion of that polymer. Thus, for flame retardant materials, a higher LOI indicates a higher flame retardance. The UL-94 vertical burning test determines how long a suspended polymer specimen will burn when the polymer specimen is exposed to flame from below. The best rating under UL-94 is V-0 and corresponds to a material that does not exhibit a burning flame for more than 10 seconds after being lit from the flame source below the sample. Additionally, a polymer with a V-0 rating will not experience dripping flames from the sample. The results of the testing are displayed in Table 3. ("NR" as used in Table 3 means that the sample was not rated).

TABLE 3

Flame Retardant Properties of Polypropylene Samples

| Samples | PP (wt %) | APP/ PER (wt %) | PIL/ zeolite 4A (wt %) | LOI (%) | UL-94 | Dripping |
|---|---|---|---|---|---|---|
| PP | 100 | 0 | 0 | 18.0 | NR | Yes |
| PP control | 80 | 20 | 0 | 23.2 | NR | Yes |
| PP-LSZH | 80 | 19 | 1 | 32.4 | V-0 | No |

Figure 3:
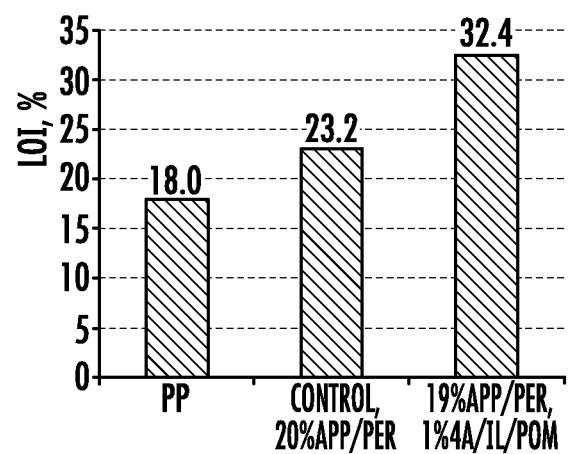
FIG. 3 depicts a graphical representation of the limiting oxygen index for a polymer compound incorporating the low smoke, zero halogen compound according to an exemplary embodiment.

Table 3 demonstrates that the addition of the LSZH additive improved the flame retardance of the polypropylene polymer. PP-LSZH possesses a fire performance of V-0 (non-dripping) in the UL-94 test and an LOI of 32.4%. By comparison, the PP control sample, which included 1% higher amount of the flame retardant package and no PIL and zeolite 4A, exhibited an LOI of 23.2% and a UL-94 rating of "not rated" (i.e., the sample exhibited dripping 'flames). The results of LOI test are summarized graphically in FIG. 3.

Advantageously, flame retardant package with the LSZH additive provides these enhancements while only being loaded into the polymer compound at 20% by weight. Accordingly, the flame retardant package with the LSZH additive does not have a substantial impact on the mechanical properties of the polymer resin.

It is surmised that the LSZH additive significantly improves the efficacy of flame retardant compositions (and more specifically of intumescent compositions) by its catalytic effect on the charring process, i.e., by making the carbonization faster and the formed char residue denser. More specifically, it is surmised that a synergism exists between the zeolite 4A and the PIL that enables the catalytic effect. Regardless of the mechanism, the LSZH provides better flame retardance as evidenced by the results summarized in Table 3 and FIG. 3. Accordingly, using the LSZH additive could allow for reduced loading of a given polymer resin while maintaining the same flame retardant performance, which can provide a material cost savings. Alternatively, the LSZH can allow for increased flame retardant performance at the same loading, which may allow for improved burn performance ratings than previously achieved.

The flame retardant polymer composition, including the LSZH additive, as described herein can be used for a variety of applications. For instance, the polymer composition can be added to wood or steel beams and to the walls of a structure to provide a fire retardant coating.

Figure 4:
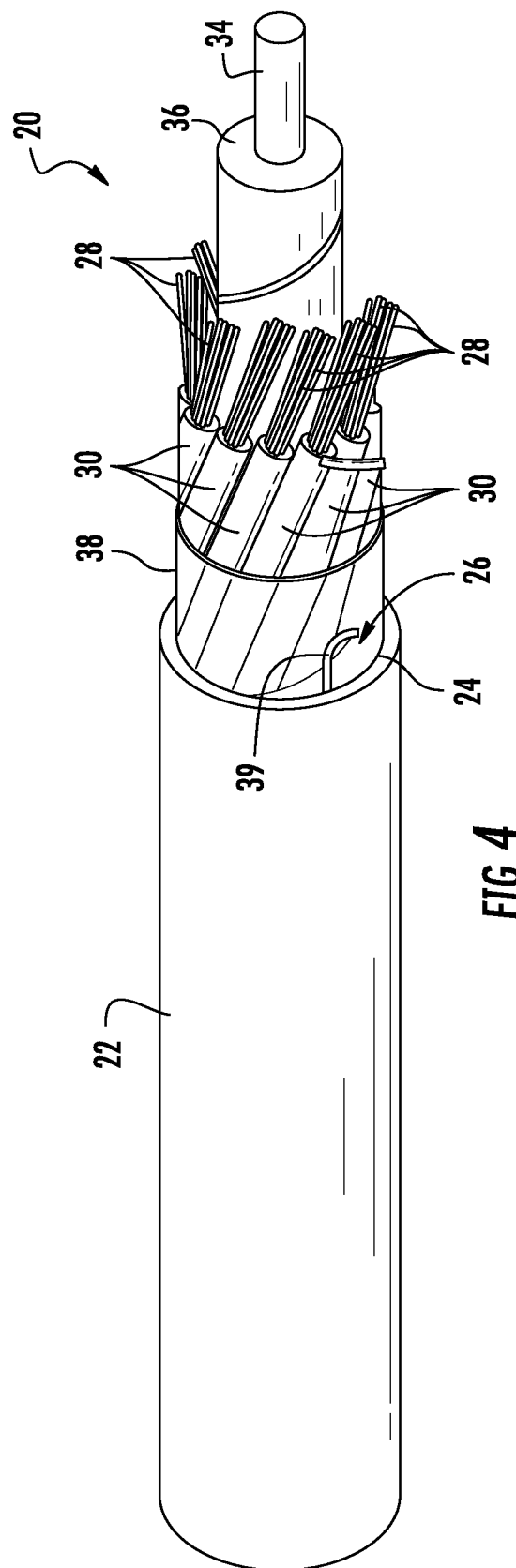
FIG. 4 depicts a cable including one or more components incorporating a polymer compound including the low smoke, zero halogen additive according to another exemplary embodiment.

In a particular embodiment as shown in FIG. 4, the flame retardant polymer composition, including the LSZH additive, is used as a jacket for a cable or other fiber optic cable components. Various fiber optic cable components include or, in some embodiments, are made from polymer compounds that are based on polyolefin and olefin copolymers. Without modification, these polyolefin and olefin copolymers are combustible. Accordingly, incorporating the LSZH additive to the polymers that make up fiber optic cable components is expected to reduce combustibility.

By way of example of how and where the LSZH additive can be incorporated, FIG. 4 depicts a fiber optic cable 20, including the LSZH additive. Cable 20 includes a cable body, shown as cable jacket 22, having an inner surface 24 that defines a channel, shown as central bore 26. Pluralities of communication elements, shown as optical fibers 28, are located within bore 26. The cable 20 includes a plurality of core elements located within central bore 26. A first type of core element is an optical transmission core element, and these core elements include bundles of optical fibers 28 that are located within tubes, shown as buffer tubes 30. Buffer tubes 30 are arranged around a central support, shown as central strength member 34. Central strength member 34 includes an outer coating layer 36. A barrier material, such as water barrier 38, is located around the wrapped buffer tubes 30. An easy access structure, shown as rip cord 39, may be located inside cable jacket 22 to facilitate access to buffer tubes 30.

In one embodiment, the flame retardant package, including the LSZH additive, is incorporated into the polymer material of cable jacket 22 of fiber optic cable 20. In another embodiment, the flame retardant package, including the LSZH additive, is incorporated into the polymer material of buffer tubes 30 surrounding the bundles of optical fibers 28. In a further embodiment, the flame retardant package, including the LSZH additive, is incorporated into the water barrier 38. By surrounding the cable and cable components with the flame retardant package, including the LSZH additive, the ability of fire to spread along cable 20 is reduced, and the amount of smoke produced by cable 20 during fire exposure is also reduced.

It is believed that the flame retardant package, including the LSZH additive, discussed above will meet certain flame retardant standards when incorporated in an electrical or tele-communication cable, such as cone calorimeter reaction-to-fire test ISO 5660; limiting oxygen index (LOI) test ISO 4589; single cable test IEC 60332-1-2; vertical multi cable test DIN 50399/IEC 60332-3-24; and in smoke density chamber IEC 61034.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A low smoke, zero halogen (LSZH) polymer composition, comprising:
    a polymer resin; and
    a flame retardant package dispersed within the polymer resin, wherein the flame retardant package comprises:
        an acid source;
        a carbon source; and
        an LSZH additive, comprising:
            a polyoxometalate ionic liquid; and
            a synergist carrier comprising a zeolite.

2. The LSZH polymer composition of claim 1, wherein the polyoxometalate ionic liquid is formed from an ionic liquid selected from the group consisting of 1-ethyl-3-methyl-imidazolium ethyl sulfate, 1-butyl-3-methylimidazolium hexafluorophosphate, 1-butyl-3-methylimidazolium tetrafluoroborate, 1-hexyl-3-methylimidazolium hexafluorophosphate, 1-butyl-3-methylimidazolium bis(trifluoromethanesulfonyl)imide, 1-ethyl-3-methylimidazolium trifluoromethanesulfonate, scandium(III) trifluoromethanesulfonate, praseodymium (III) trifluoromethanesulfonate, 1,3-dialkyl-1,2,3-triazolium hexafluorophosphate, 1,3-dialkyl-1,2,3-triazolium bis(trifluoromethanesulfonyl)imide, 1,2,4-trimethylpyrazolium methylsulfate, and combinations thereof.

3. The LSZH polymer composition of claim 1, wherein the polyoxometalate ionic liquid is formed from a polyoxometalate selected from the group consisting of $[PW_{12}O_{40}]^{3-}$, $[PMo_{12}O_{40}]^{3-}$, $[SiW_{12}O_{40}]^{4-}$, $[SiMo_{12}O_{40}]^{4-}$, $[BW_{12}O_{40}]^{3-}$, $[BMo_{12}O_{40}]^{3-}$, $[AsW_{12}O_{40}]^{5-}$, $[AsMo_{12}O_{40}]^{5-}$, $[GeW_{12}O_{40}]^{4-}$, $[GeMo_{12}O_{40}]^{4-}$, $[PMo_9V_3O_{40}]^{5-}$, $[PMo_{10}V_2O_{40}]^{5-}$, $[PMo_{11}VO_{40}]^{4-}$, $[P_2W_{18}O_{62}]^{6-}$, $[P_2Mo_{18}O_{62}]^{6-}$, $[As_2W_{18}O_{62}]^{6-}$, $[As_2Mo_{18}O_{62}]^{6-}$, $[W_6O_{19}]^{2-}$, $[Mo_6O_{19}]^{2-}$, $[V_6O_{19}]^{8-}$, $[Nb_6O_{19}]^{8-}$, and combinations thereof.

4. The LSZH polymer composition of claim 1, wherein the synergist carrier further comprises at least one of a bentonite or zinc.

5. The LSZH polymer composition of claim 1, wherein the zeolite comprises zeolite 4A.

6. The LSZH polymer composition of claim 1, wherein the LSZH additive comprises between 0.5 and 5%, by weight, of the polymer composition dispersed within the polymer resin.

7. The LSZH polymer composition of claim 1, wherein flame retardant package comprises between 10% and 30%, by weight, of the polymer composition dispersed within the polymer resin.

8. The LSZH polymer composition of claim 1, wherein a weight ratio of the acid source to the carbon source is at least 2:1.

9. The LSZH polymer composition of claim 1, wherein the acid source is ammonium polyphosphate.

10. The LSZH polymer composition of claim 1, wherein the carbon source is selected from the group consisting of pentaerythritol and its derivatives, phenol formaldehyde resins, polyamides, sorbitol, starches, cyclodextrins, and combinations thereof.

11. The LSZH polymer composition of claim 1, wherein the polymer resin is selected from the group consisting of ethylene-vinyl acetate copolymers, ethylene-acrylate copolymers, ethylene homopolymers, linear low density polyethylene, very low density polyethylene, polyolefin elastomer copolymer, propylene homopolymer, polyethylene-polypropylene copolymer, butene- and octene branched copolymers, maleic anhydride-grafted versions of the polymers listed herein, and combinations thereof.

12. The LSZH polymer composition of claim 1, wherein flame retardant package further comprises a spumific compound.

13. The LSZH polymer composition of claim 12, wherein the spumific compound includes melamine.

14. The LSZH polymer composition of claim 1, wherein less than 25% by weight of the polymer composition is the flame retardant package and wherein the LSZH polymer composition has a limiting oxygen index of greater than 31%.

15. The LSZH polymer composition of claim 1, wherein the flame retardant package further comprises at least one of aluminum trihydroxide or magnesium dihydroxide.

\* \* \* \* \*

UNITED STATES PATENT AND TRADEMARK OFFICE
CERTIFICATE OF CORRECTION

PATENT NO. : 10,759,922 B2
APPLICATION NO. : 16/193634
DATED : September 1, 2020
INVENTOR(S) : Dayue Jiang et al.

Page 1 of 1

It is certified that error appears in the above-identified patent and that said Letters Patent is hereby corrected as shown below:

In the Claims

In Column 8, Line 4, Claim 2, delete "ethyl sulfate," and insert -- ethylsulfate, --, therefor.

In Column 8, Line 28, Claim 4, delete "zinc." and insert -- zinc borate. --, therefor.

In Column 8, Line 55, Claim 11, delete "butene-" and insert -- butene --, therefor.

Signed and Sealed this
Twenty-fourth Day of November, 2020

Andrei Iancu
*Director of the United States Patent and Trademark Office*